United States Patent
Elizalde et al.

(10) Patent No.: US 7,906,172 B2
(45) Date of Patent: Mar. 15, 2011

(54) METHOD FOR COATING SURFACES AND SUITABLE PARTICLES THEREFOR

(75) Inventors: Oihana Elizalde, Mannheim (DE); Michael Schmitt, Worms (DE); Marc Bothe, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 374 days.

(21) Appl. No.: 12/066,335

(22) PCT Filed: Sep. 11, 2006

(86) PCT No.: PCT/EP2006/066231
§ 371 (c)(1), (2), (4) Date: Mar. 10, 2008

(87) PCT Pub. No.: WO2007/031490
PCT Pub. Date: Mar. 22, 2007

(65) Prior Publication Data
US 2008/0254212 A1  Oct. 16, 2008

(30) Foreign Application Priority Data

Sep. 16, 2005 (DE) .................. 10 2005 044 521

(51) Int. Cl.
*B05D 1/12* (2006.01)
*B05B 5/16* (2006.01)
(52) U.S. Cl. ......... 427/202; 427/180; 427/201; 428/240
(58) Field of Classification Search .................. 427/180, 427/201, 202
See application file for complete search history.

(56) References Cited

U.S. PATENT DOCUMENTS

| 3,354,022 A | 11/1967 | Dettre et al. |
| 5,888,290 A * | 3/1999 | Engle et al. ............... 106/287.12 |
| 6,660,363 B1 | 12/2003 | Barthlott |
| 6,884,839 B1 * | 4/2005 | Bendix et al. .................. 524/570 |
| 2004/0213997 A1 | 10/2004 | Bonastre Gilabert et al. |
| 2006/0174418 A1 | 8/2006 | Keller et al. |
| 2006/0263602 A1 * | 11/2006 | Choi et al. .................... 428/407 |

FOREIGN PATENT DOCUMENTS

| CA | 2050450 | 3/1992 |
| EP | 0 474 203 A2 | 3/1992 |
| EP | 1283296 B1 | 2/2003 |
| EP | 1 449 912 A1 | 8/2004 |
| JP | 4-300365 | 10/1992 |
| WO | WO 96/04123 | 2/1996 |
| WO | WO 97/00995 | 1/1997 |
| WO | WO 01/62376 A1 | 8/2001 |
| WO | WO 2004/074568 A1 | 9/2004 |

OTHER PUBLICATIONS

U.S. Appl. No. 12/514,321, filed May 11, 2009, Elizalde, et al.

* cited by examiner

*Primary Examiner* — Frederick J Parker
(74) *Attorney, Agent, or Firm* — Oblon, Spivak, McClelland, Maier & Neustadt, L.L.P.

(57) ABSTRACT

A process for coating a surface comprises said surface being coated with particles (A) comprising a core (a) and at least one envelope (b) other than said core (a), and optionally with at least one hydrophobicizing agent (B) and thereafter thermally treated.

14 Claims, No Drawings

METHOD FOR COATING SURFACES AND SUITABLE PARTICLES THEREFOR

The present invention relates to a process for coating a surface, which comprises said surface being coated with particles (A) comprising a core (a) and at least one envelope (b) other than said core (a), and optionally with at least one hydrophobicizing agent (B) and thereafter thermally treated.

The present invention further relates to coated surfaces. The present invention further relates to particles (A') which are particularly useful for carrying out the process of the present invention. The present invention further relates to aqueous formulations which are particularly useful for carrying out the process of the present invention and to a process for producing aqueous formulations which are in accordance with the present invention.

For some years there has been appreciable interest in treating surfaces such that they are soil repellent or at least difficult to soil. Various methods involve providing the surfaces with texturing, for example with elevations 5 to 100 μm high and 5 to 200 μm spaced apart. A surface has been endowed with texturing that seeks to emulate the lotus plant, see for example WO 96/04123 and U.S. Pat. No. 3,354,022. However, such an approach is not always advisable and unsuitable for treating textile surfaces.

EP 1 283 296 discloses coating textile sheetlike constructions with a coating prepared by coating them with 50% to 80% by weight of at least one finely divided material selected from for example potato starch and oxidic materials such as for example silica gel, quartz flour or kaolin, having diameters in the range from 0.5 to 100 μm (at least 80% by weight of the finely divided material), 20% to 50% by weight of a matrix comprising a binder, a fluorinated polymer and if appropriate auxiliaries.

WO 04/74568 discloses a process for finishing textile materials by treatment with at least one aqueous liquor comprising at least one organic polymer and at least one organic or inorganic solid in particulate form, the organic or inorganic solid or solids being present in the liquor in a fraction of at least 5.5 g/l. Silica gel, in particular fumed silica gel, is preferred as solid in particulate form.

Potato starch, as recommended in EP 1 283 296, however, has a certain solubility in aqueous liquors, so that the diameter of the potato starch particles cannot be optimally controlled during a coating operation. Especially in the case of inorganic solids such as silica gel for example, a certain propensity to agglomerate is observed, which is disadvantageous at application and makes placing of the textural parameters more difficult.

It is further observed that there are many cases where such textiles, coated by the aforementioned methods, possess insufficient washability at times. If, for example, sweaty textiles are washed, it is to be observed that the soil-repellent effect is reduced after the first wash and has virtually disappeared after several wash cycles.

The present invention has for its object to provide a process for treating surfaces which avoids the abovementioned disadvantages, in particular with regard to the treatment of textile surfaces. The present invention further has for its object to provide treated surfaces which avoid the abovementioned disadvantages and exhibit good soil repellency.

We have found that this object is achieved by the process defined at the beginning.

The process of the invention is directed to surfaces. Surfaces for the purposes of the present invention may consist of any desired material and belong to any desired article. Preference is given to surfaces of flexible substrate. Particular preference is given to surfaces composed of fibrous materials such as for example paper, board, leather, artificial leather, Alcantara, and more particularly surfaces are surfaces of textiles, i.e., they are textile surfaces.

Textiles for the purposes of the present invention are textile fibers, textile intermediate and end products and finished articles manufactured therefrom which, as well as textiles for the apparel industry, also comprise for example carpets and other home textiles and also textile constructions for industrial purposes. These include unshaped constructions such as for example staples, linear constructions such as twine, filaments, yarns, lines, strings, laces, braids, cordage and also three-dimensional constructions such as for example felts, wovens, nonwovens and waddings. Textiles for the purposes of the present invention can be of natural origin, examples being cotton, wool or flax, or synthetic, examples being polyamide, polyester, modified polyester, polyester blend fabrics, polyamide blend fabrics, polyacrylonitrile, triacetate, acetate, polycarbonate, polypropylene, polyvinyl chloride, polyester microfibers and glass fiber fabrics. Textiles composed of cotton are particularly preferred.

For the purposes of the present invention, textile sheetlike constructions may have one surface (side, face) coated by the process of the present invention and the other not, or both surfaces (sides, faces) may be treated by the process of the present invention. For example, there are some garments such as workwear, for example where it may be sensible to treat the outer surface by the process of the present invention and the inside (body-facing) surface not; and it may be sensible on the other hand for both sides (front and back) of some industrial textiles such as awnings for example to be treated by the process of the present invention.

In accordance with the present invention, the above-described surface or surfaces is or are coated with particles (A) comprising a core (a) and at least one envelope (b) other than core (a) and thereafter treated thermally.

In one embodiment of the present invention, particles (A) have a number average diameter in the range from 20 to 1000 nm, preferably in the range from 25 to 475 nm and more preferably in the range from 50 to 300 nm. Particle diameter may be measured using commonly deployed methods such as transmission electron microscopy for example.

In one embodiment of the present invention, the core (a) of particles (A) has an average diameter in the range from 10 to 950 nm, preferably up to 450 nm and more preferably in the range from 15 to 250 nm.

The number average diameter of core (a) and the thickness of envelope (b) can advantageously be determined arithmetically by determining the average diameter of core (a) and of envelope (b) on the assumption of an appropriate, particularly a complete, conversion in the course of the production of particles (A) and using as density in each case the density of core (a) and envelope (b) which were produced in the absence of whichever is the other component, envelope (b) or core (a).

In one embodiment of the present invention, particles (A) have a monomodal distribution of diameter. In another embodiment of the present invention, particles (A) can have a bimodal distribution of diameter.

One embodiment of the present invention comprises particles (A) being present neither in the form of aggregates nor in the form of agglomerates.

One embodiment of the present invention comprises particles (A) having an irregular shape. Preferably, particles (A) have a regular shape, for example ellipsoidal or, in particular, spherical.

Core (a) and envelope (b) each preferably comprise an organic copolymer.

Core (a) and envelope (b) are mutually different. In one embodiment of the present invention, core (a) and envelope (b) comprise different organic copolymers, i.e., copolymers that differ in number or chemical structure, for example. In another embodiment of the present invention, core (a) and envelope (b) comprise different organic copolymers which are prepared from the same comonomers, but in different comonomer ratios.

In one embodiment of the present invention, core (a) and envelope (b) are covalently linked to each other.

In one specific embodiment of the present invention, particles (A) comprise a core-shell polymer, the shell corresponding to the envelope (b).

In one embodiment of the present invention, core (a) comprises a crosslinked copolymer of at least one ethylenically unsaturated compound, for example a copolymer of a vinylaromatic compound or of a $C_1$-$C_{10}$-alkyl ester of (meth)acrylic acid. One or more crosslinkers can be used as comonomer for example. Further comonomers useful, if appropriate, for preparing core (a) include one or more compounds free radically copolymerizable with ethylenically unsaturated compounds, examples being $C_1$-$C_{10}$-alkyl (meth)acrylates, ω-hydroxy-$C_2$-$C_4$-alkylene (meth)acrylates, singly ethylenically unsaturated carboxylic acids, (meth)acrylamide, unsubstituted or singly or doubly substituted with $C_1$-$C_{10}$-alkyl or di-$C_1$-$C_{10}$-n-alkyl-$C_2$-$C_4$-alkylene, especially N,N-dimethylaminopropylmethacrylamide (DMAPMAM).

Examples of suitable vinylaromatic compounds are for example α-methylstyrene, para-methylstyrene, 2,4-dimethylstyrene and especially styrene.

Examples of particularly suitable $C_1$-$C_{20}$-alkyl esters of (meth)acrylic acid are n-butyl (meth)acrylate and methyl methacrylate.

Useful crosslinkers include for example di- and trivinylaromatics, for example ortho-divinylbenzene, meta-divinylbenzene and para-divinylbenzene, (meth)acrylates of di- or trihydric alcohols, examples being ethylene glycol di(meth)acrylate, 1,3-propanediol di(meth)acrylate, 1,4-butanediol di(meth)acrylate, 1,6-hexanediol di(meth)acrylate, 1,1,1-trimethylolpropane di(meth)acrylate, 1,1,1-trimethylolpropane tri(meth)acrylate, and also allyl (meth)acrylate and glycidyl (meth)acrylate.

Examples of suitable $C_1$-$C_{10}$-alkyl (meth)acrylates are methyl (meth)acrylate, ethyl (meth)acrylate, n-propyl (meth)acrylate, isopropyl (meth)acrylate, n-butyl (meth)acrylate, n-hexyl (meth)acrylate, 2-ethylhexyl (meth)acrylate, n-decyl (meth)acrylate.

Examples of suitable ω-hydroxy-$C_2$-$C_4$-alkylene (meth)acrylates are 4-hydroxybutyl (meth)acrylate, 3-hydroxypropyl (meth)acrylate and especially 2-hydroxyethyl (meth)acrylate.

Particularly suitable singly ethylenically unsaturated carboxylic acids are for example maleic acid, fumaric acid, E- and Z-crotonic acids, itaconic acid and especially acrylic acid and methacrylic acid.

Examples of $C_1$-$C_{10}$-alkyl- or di-$C_1$-$C_{10}$-amino-n-alkyl-$C_2$-$C_4$-alkylene-mono- or -disubstituted(meth)acrylamide are N-methyl(meth)acrylamide, N,N-dimethyl(meth)acrylamide, N-ethyl(meth)acrylamide, N,N-dimethylaminoethyl (meth)acrylamide and N,N-dimethylaminopropyl(meth)acrylamide.

Organic crosslinked copolymers for core (a) may be prepared using for example up to 25 mol %, preferably up to 20 mol % and at least 1 mol % of crosslinker with at least 75 mol %, preferably at least 80 mol % and more preferably up to 99 mol % of one or more aforementioned singly ethylenically unsaturated comonomers.

In one embodiment of the present invention, particles (A) also comprise an envelope (b) comprising a crosslinked or crosslinking-capable copolymer of for example at least one ethylenically unsaturated carboxylic acid or at least one ester or amide of an ethylenically unsaturated carboxylic acid.

In one embodiment of the present invention, particles (A) comprise an envelope (b) comprising a crosslinked or further crosslinking-capable copolymer of for example at least one ethylenically unsaturated carboxylic acid or at least one ester or amide of an ethylenically unsaturated carboxylic acid, i.e., the envelope comprises a so-called incipiently crosslinked copolymer.

To accomplish crosslinking of envelope (b), one or more of the above-described crosslinkers may be interpolymerized into the copolymer in question, for example at up to 7% by weight, based on the total weight of particles (A), preferably 0.1% to 5% by weight.

Crosslinking-capable copolymers is to be understood as meaning for example such copolymers as, under the conditions of the thermal treatment in a further step of the process of the present invention, undergo a reaction and crosslink as a result. For example, such copolymers as comprise one or more comonomers having epoxy groups, NH—CH$_2$OH groups or acetoacetyl groups in interpolymerized form are suitable.

Particularly suitable comonomers having epoxy groups are for example mono- or diglycidyl esters of itaconic acid, maleic acid, fumaric acid, and glycidyl esters of E- and Z-crotonic acids and especially of acrylic acid and of methacrylic acid.

Particularly suitable comonomers having NH—CH$_2$OH groups are for example reaction products of formaldehyde with singly ethylenically unsaturated carboxamides, especially N-methylolacrylamide and N-methylolmethacrylamide.

Particularly suitable comonomers having acetoacetyl groups are for example (meth)acrylates of alcohols of the general formula I

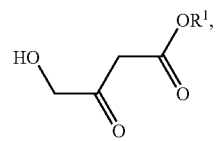

I where

R$^1$ is selected from branched or unbranched $C_1$-$C_{10}$-alkyl, such as methyl, ethyl, n-propyl, iso-propyl, n-butyl, iso-butyl, sec-butyl, tert-butyl, n-pentyl, iso-pentyl, sec-pentyl, neopentyl, 1,2-dimethylpropyl, iso-amyl, n-hexyl, iso-hexyl, sec-hexyl, n-heptyl, n-octyl, 2-ethylhexyl, n-nonyl, n-decyl, more preferably unbranched $C_1$-$C_4$-alkyl such as methyl, ethyl, n-propyl and n-butyl.

Further suitable comonomers for preparing envelope (b) are for example vinylaromatic compounds, $C_1$-$C_{10}$-alkyl (meth)acrylates, ω-hydroxy-$C_2$-$C_4$-alkylene (meth)acrylates and (meth)acrylic acid.

In one embodiment of the present invention, core (a) or envelope (b) or core (a) and envelope (b) comprise an anionic copolymer or different anionic copolymers. By anionic copolymers are meant in the context of the present invention such copolymers as are prepared from ethylenically unsaturated compounds which are free radically polymerizable and of which one (a so-called anionic comonomer) carries per molecule at least one group deprotonatable in aqueous formulation, an example being methacrylic acid or vinylphosphonic acid.

In another embodiment of the present invention, core (a) or envelope (b) or core (a) and envelope (b) comprise a cationic copolymer or different cationic copolymers. By cationic copolymers are meant in the context of the present invention such copolymers as are prepared from ethylenically unsaturated compounds which are free radically polymerizable and of which one (a so-called cationic comonomer) carries per molecule at least one group protonatable in aqueous formulation, for example one or more nitrogen atoms having a free electron pair, or cationic groups such as for example quaternary nitrogen atoms built into the polymer chain.

Cationic copolymers may be taken to refer for example to such copolymers as bear free amino groups, for example $NH_2$ groups, $NH(C_1-C_4\text{-alkyl})$ groups, $N(C_1-C_4\text{-alkyl})_2$ groups or $(C_1-C_4\text{-alkyl})_2N-C_2-C_{10}$-alkylene groups, especially $(CH_3)_2N-C_2-C_4$-alkylene groups.

In one embodiment of the present invention, cationic copolymers under acidic conditions, for example at pH 6 or less, are present in at least partially protonated form.

In one embodiment of the present invention, cationic copolymers may be taken to be such copolymers as comprise in interpolymerized form one or more amides of at least one ethylenically unsaturated carboxylic acid, for example (meth)acrylamide as one of the comonomers.

In one embodiment of the present invention, cationic copolymers are copolymers constructed of at least one nonionic comonomer, for example a vinylaromatic compound such as for example styrene or at least one $C_1-C_{20}$-alkyl ester of at least one ethylenically unsaturated carboxylic acid, and at least one comonomer having at least one protonatable or quaternized nitrogen atom per molecule.

Cationic copolymers within the meaning of the present invention may also comprise one or more anionic comonomers such as for example (meth)acrylic acid or crotonic acid in interpolymerized form. When cationic copolymers comprise also at least one anionic monomer in interpolymerized form, the molar fraction of cationic comonomers is always higher than the molar fraction of anionic comonomers, for example by 0.5 mol %, based on total cationic copolymer, preferably at least 1 mol % and more preferably 1.5 to 20 mol %.

In one embodiment of the present invention, envelope (b), or crosslinked or crosslinking-capable copolymer present in envelope (b), has a glass transition temperature $T_g$ in the range from −50 to +30° C. and preferably in the range from −20 to +30° C.

Particles (A) comprising a core (a) and at least one envelope (b) other than core (a) may be prepared in various ways, for example by multistaged emulsion polymerization with one or more free radical initiators in the presence of one or more emulsifiers or by an emulsion polymerization in the gradient mode. Core (a) is synthesized before envelope (b) is synthesized using a changed composition of comonomer. Preferably, core (a) is prepared by an emulsion polymerization in the seed mode; that is, initially one or more water-insoluble polymers such as for example polystyrene are added in very small particles, for example having a number average diameter in the range from 10 to 30 nm, which then foster droplet formation during the copolymerization.

The process of the present invention comprises optionally further coating with at least one hydrophobicizing agent (B).

Hydrophobicizing agent (B) is preferably selected from halous polymers (B1), paraffins (B2) and compounds having at least one $C_{10}-C_{60}$-alkyl group per molecule (B3).

Useful halous polymers (B1) include for example chlorinated and especially fluorinated (co)polymers preparable by preferably free radical (co)polymerization of one or more singly or multiply halogenated, preferably chlorinated and more preferably fluorinated, (co)monomers.

Very particularly preferred halous (co)monomers are fluorous olefins such as for example vinylidene fluoride, trifluorochloroethylene, tetrafluoroethylene, hexafluoropropylene, vinyl esters of fluorinated or perfluorinated $C_3-C_{11}$-carboxylic acids as described for example in U.S. Pat. No. 2,592,069 and U.S. Pat. No. 2,732,370, (meth)acrylic esters of fluorinated or perfluorinated alcohols such as for example fluorinated or perfluorinated $C_3-C_{14}$-alkyl alcohols, for example (meth)acrylic esters of $HO-CH_2-CH_2-CF_3$, $HO-CH_2-CH_2-C_2F_5$, $HO-CH_2-CH_2\text{-n-}C_3F_7$, $HO-CH_2-CH_2\text{-iso-}C_3F_7$, $HO-CH_2-CH_2\text{-n-}C_4F_9$, $HO-CH_2-CH_2\text{-n-}C_6F_{13}$, $HO-CH_2-CH_2\text{-n-}C_8F_{17}$, $HO-CH_2-CH_2-O\text{-n-}C_6F_{13}$, $HO-CH_2-CH_2-O\text{-n-}C_8F_{17}$, $HO-CH_2-CH_2\text{-n-}C_{10}F_{21}$, $HO-CH_2-CH_2\text{-n-}C_{12}F_{25}$, described for example in U.S. Pat. No. 2,642,416, U.S. Pat. No. 3,239,557 and U.S. Pat. No. 3,462,296.

Useful copolymers further include copolymers of for example (meth)acrylic acid and/or $C_1-C_{20}$-alkyl esters of (meth)acrylic acid or glycidyl (meth)acrylate with esters of the formula II

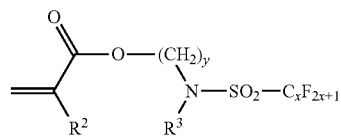

where
R² is hydrogen, $CH_3$, $C_2H_5$,
R³ is $CH_3$, $C_2H_5$,
x is an integer in the range from 4 to 12, preferably 6 to 8,
y is an integer in the range from 1 to 11, preferably 1 to 6,
or glycidyl (meth)acrylate with vinyl esters of fluorinated carboxylic acids are useful as halous polymers (B1).

Useful halous polymers (B1) further include copolymers of (meth)acrylic esters of fluorinated, especially perfluorinated, $C_3-C_{12}$-alkyl alcohols such as for example $HO-CH_2-CH_2-CF_3$, $HO-CH_2-CH_2-C_2F_5$, $HO-CH_2-CH_2\text{-n-}C_3F_7$, $HO-CH_2-CH_2\text{-iso-}C_3F_7$, $HO-CH_2-CH_2\text{-n-}C_4F_9$, $HO-CH_2-CH_2\text{-n-}C_5F_{11}$, $HO-CH_2-CH_2\text{-n-}C_6F_{13}$, $HO-CH_2-CH_2-O\text{-n-}C_6F_{13}$, $HO-CH_2-CH_2-O\text{-n-}C_8F_{17}$, $HO-CH_2-CH_2\text{-n-}C_7F_{15}$, with (meth)acrylic esters of nonhalogenated $C_1-C_{20}$-alcohols, for example methyl (meth)acrylate, ethyl (meth)acrylate, n-butyl (meth)acrylate, n-propyl (meth)acrylate, 2-ethylhexyl (meth)acrylate, n-octyl (meth)acrylate, n-decyl (meth)acrylate, n-dodecyl (meth)acrylate, n-eicosyl (meth)acrylate.

An overview of further fluorinated polymers or copolymers useful as halous polymers (B1) is to be found for example in M. Lewin et al., *Chemical Processing of Fibers and Fabrics, Part B*, volume 2, Marcel Dekker, New York (1984), pages 172 ff. and pages 178-182.

Specific fluorinated (co)polymers useful as halous organic polymers (B1) are described for example in DE 199 120 810.

The process of the present invention may be carried out using one halous (co)polymer (B1) or a plurality of different halous (co)polymers (B1).

Halous (co)polymer (B1) is preferably used in uncrosslinked form to carry out the process of the present invention, but it may crosslink during drying.

Other suitable hydrophobicizing agents (B) are paraffins (B2). Paraffins (B2) may be for example liquid or solid at room temperature and of natural or preferably synthetic origin. Preferred paraffins (B2) are synthetic paraffins such as for example Fischer-Tropsch waxes, high density polyethylene waxes, prepared using Ziegler-Natta catalysts or metallocene catalysts for example, also partially oxidized high density polyethylene waxes having an acid number in the range from 1 to 150 mg KOH/g of paraffin, determined according to DIN 53402, with high density polyethylene waxes comprising not just homopolymer waxes of ethylene, but also copolymers of polyethylene with in total up to 20% by weight of comonomer such as propylene, 1-butene, 1-pentene, 1-hexene, 1-octene, 1-decene or 1-dodecene, especially so-called paraffin waxes and isoparaffin waxes, for example crude paraffins (crude paraffin waxes), slack wax raffinates, deoiled crude paraffins (deoiled crude paraffin waxes), semi- or fully refined paraffins (semi- or fully refined paraffin waxes) and bleached paraffins (bleached paraffin waxes). By paraffin waxes are herein meant in particular room temperature solid paraffins melting in the range from 40 to 80° C., and preferably in the range from 50 to 75° C., i.e. saturated hydrocarbons, branched or unbranched, cyclic or preferably acyclic, individually or preferably as a mixture of a plurality of saturated hydrocarbons. Paraffin waxes in the context of the present invention are preferably composed of saturated hydrocarbons having 18 to 45 carbon atoms. Isoparaffins in the context of the present invention are preferably composed of saturated hydrocarbons having 20 to 60 carbon atoms per molecule.

Useful hydrophobicizing agents (B) further include linear or heterocyclic, preferably heteroaromatic compounds having at least one $C_{10}$-$C_{60}$-alkyl group, preferably having a $C_{12}$-$C_{40}$-alkyl group per molecule (B3), hereinafter also abbreviated to compound (B3), the $C_{10}$-$C_{60}$-alkyl groups being different or preferably the same and branched or preferably unbranched. Preference is given to such compounds (B3) as are able to detach at least one fatty amine or at least one fatty alcohol on heating to temperatures in the range from 120 to 200° C., i.e., an amine or an alcohol having a $C_{10}$-$C_{60}$-alkyl group.

Very particular preference is given to compounds of the general formula II

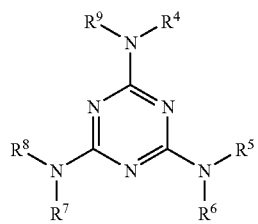

where
$R^4$ is selected from $C_{10}$-$C_{60}$-alkyl, branched or preferably unbranched, for example n-$C_{10}H_{21}$, n-$C_{12}H_{25}$, n-$C_{14}H_{29}$, n-$C_{16}H_{33}$, n-$C_{18}H_{37}$, n-$C_{20}H_{41}$, n-$C_{30}H_{61}$, n-$C_{40}H_{81}$, n-$C_{50}H_{101}$, n-$C_{60}H_{121}$, and $CH_2OR^{10}$, where $R^{10}$ is selected $C_{10}$-$C_{60}$-alkyl, branched or preferably unbranched, for example n-$C_{10}H_{21}$, n-$C_{12}H_{25}$, n-$C_{14}H_{29}$, n-$C_{16}H_{33}$, n-$C_{18}H_{37}$, n-$C_{20}H_{41}$, n-$C_{30}H_{61}$, n-$C_{40}H_{81}$, n-$C_{50}H_{101}$, n-$C_{60}H_{121}$. Carbon numbers and corresponding hydrogen numbers are to be considered averages.

$R^5$ to $R^9$ are different or preferably the same and are selected from hydrogen, $R^4$, $CH_2$—OH, $CH_2$—O—$C_1$-$C_{10}$-alkyl, especially $CH_2$—$OCH_3$, $CH_2$—$OC_2H_5$, $CH_2$—O-n-$C_4H_9$, $CH_2$—$OCH_2CH_2OH$, $CH_2$—$OCH_2CH_2O$—$C_1$-$C_{10}$-alkyl, especially $CH_2$—$OCH_2CH_2OCH_3$, $CH_2$—$OCH_2CH_2OC_2H_5$, $CH_2$—$OCH_2CH_2$O-n-$C_4H_9$, $CH_2$—$(OCH_2CH_2)_2O$—H, $CH_2$—$(OCH_2CH_2)_2O$—$C_1$-$C_{10}$-alkyl, especially $CH_2$—$(OCH_2CH_2)_2OCH_3$, $CH_2$—$(OCH_2CH_2)_2OC_2H_5$, and $CH_2$—$(OCH_2CH_2)_2$O-n-$C_4H_9$.

Further particularly preferred examples of compounds (B3) are compounds of the general formula III

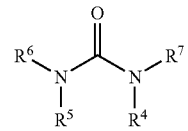

where the variables are each as defined above.

One embodiment of the present invention utilizes a hydrophobicizing agent (B) comprising a combination of at least one paraffin (B2) and at least one compound (B3).

One embodiment of the present invention utilizes particles (A) and hydrophobicizing agent (B) in a weight ratio in the range from 1:5 to 5:1 and preferably in the range from 1:3 to 3:1.

The coating may be carried out in the presence of at least one emulsifier (C) in one specific embodiment of the present invention. Anionic, cationic and nonionic surface-active compounds are useful as emulsifiers (C).

Suitable nonionic surface-active compounds are for example ethoxylated mono-, di- and trialkylphenols (degree of ethoxylation in the range from 3 to 50, alkyl radical: $C_4$ to $C_{12}$) and also ethoxylated fatty alcohols (degree of ethoxylation in the range from 3 to 80; alkyl radical: $C_8$ to $C_{36}$). Examples are the Lutensol® brands of BASF Aktiengesellschaft or the Triton® brands of Union Carbide. Further suitable nonionic surface-active compounds are those of the general formula II

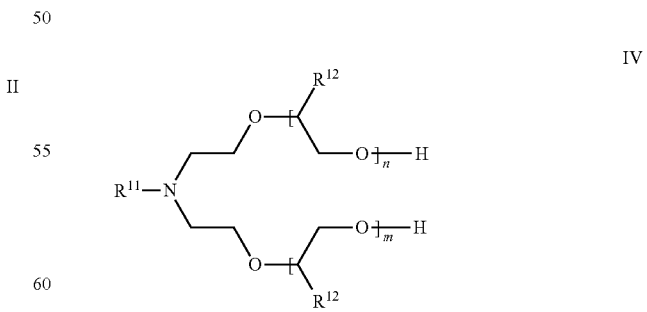

$R^{11}$ selected from $C_6$-$C_{40}$-alkyl, for example n-hexyl, iso-hexyl, n-heptyl, iso-heptyl, n-octyl, iso-octyl, n-nonyl, n-decyl, iso-decyl, n-undecyl, n-dodecyl, iso-dodecyl, n-tridecyl, n-tetradecyl, iso-tetradecyl, n-pentadecyl, n-hexadecyl, n-octadecyl, n-eicosyl, n-$C_{30}H_{61}$, n-$C_{40}H_{81}$, $C_3$-$C_{40}$-alkenyl having one to five C—C double bonds, the C—C double bonds being isolated or conjugated for example. Specific examples are allyl, —$(CH_2)_2$—CH=$CH_2$, all-cis-$(CH_2)_8$—(CH=CH—$CH_2)_3CH_3$, all-cis-$(CH_2)_8$—(CH=CH—$CH_2)_2(CH_2)_4$—$CH_3$, cis-$(CH_2)_8$CH=CH—$(CH_2)_7CH_3$, $R^{12}$ the same or different and selected from hydrogen and methyl, preferably hydrogen, m and n the same or different and selected from integers in the range from 0 to 20 and preferably in the range from 2 to 12.

Suitable anionic surface-active compounds are for example alkali metal and ammonium salts of alkyl sulfates (alkyl radical: $C_8$ to $C_{12}$), of sulfuric monoesters of ethoxylated alkanols (degree of ethoxylation in the range from 4 to 30, alkyl radical: $C_{12}$ to $C_{18}$) and of ethoxylated alkylphenols (degree of ethoxylation in the range from 3 to 50, alkyl radical: $C_4$ to $C_{12}$), of alkylsulfonic acids (alkyl radical: $C_{12}$-$C_{18}$) and of alkylarylsulfonic acids (alkyl radical: $C_9$ to $C_{18}$). Specific suitable anionic surface-active compounds are alkali metal and ammonium salts of sulfitized $C_5$-$C_{40}$-alkyl monoesters of succinic acid.

Suitable cationic surface-active compounds are generally $C_6$-$C_{18}$-alkyl-, $C_6$-$C_{18}$-aralkyl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples which may be mentioned are dodecylammonium acetate or the corresponding hydrochloride, the chlorides or acetates of the various 2-(N,N,N-trimethylammonium)ethylparaffinic acid esters, N-cetylpyridinium chloride, N-laurylpyridinium sulfate, N-cetyl-N,N,N-trimethylammonium bromide, N-dodecyl-N,N,N-trimethylammonium bromide, N,N-distearyl-N,N-dimethylammonium chloride and also the Gemini surfactant N,N-(lauryldimethyl)ethylenediamine dibromide. Numerous further examples may be found in H. Stache, *Tensid-Taschenbuch*, Carl-Hanser-Verlag, Munich, Vienna, 1981 and in McCutcheon's, *Emulsifiers & Detergents*, MC Publishing Company, Glen Rock, 1989.

Useful emulsifiers (C) include for example emulsifiers used in the preparation of particles (A) and not removed after the preparation of particles (A).

The process of the present invention may be carried out for example by surface to be coated being contacted with at least one preferably aqueous formulation comprising particles (A) comprising a core (a) and at least one envelope (b) other than core (a) and optionally with at least one hydrophobicizing agent (B) and thereafter thermally treated.

It is also possible to perform a plurality of coating steps with identical or different preferably aqueous formulations.

One version of the present invention comprises contacting with two different aqueous formulations, one comprising particles (A) comprising a core (a) and at least one envelope (b) other than core (a) and the other comprising at least one hydrophobicizing agent (B) and treating thereafter thermally.

Aqueous formulations may be any desired aqueous suspensions and preferably are aqueous liquors or floats.

Aqueous formulations and especially aqueous liquors or floats may have a solids content in the range from 10% to 70% by weight and preferably in the range from 30% to 50% by weight.

The temperature for practicing the coating is in itself not critical. The temperature may be in the range from 10 to 60° C. and preferably in the range from 15 to 30° C.

Aqueous formulation and preferably aqueous liquor or float may have a pH in the range from 2 to 9 and preferably in the range from 3.5 to 7.5.

To practice the process of the present invention by contacting the surface with an aqueous liquor or float, the wet pickup may be chosen such that the process of the present invention results in a wet pickup in the range from 25% by weight to 95% by weight and preferably in the range from 60% by weight to 90% by weight.

The coating of the present invention is in one embodiment of the present invention carried out in commonly deployed machines used for the finishing of textiles, pad-mangles being an example. Preference is given to vertical feed pad-mangles, where the essential element is two rollers in pressed contact with each other, through which the textile is led. The preferably aqueous formulation is filled in above the rollers and wets the textile. The pressure causes the textile to be squeezed off and ensures a constant add-on. In other preferred pad-mangles, textile is first led through a dip bath and then upwardly through two rolls in pressed contact with each other. In the latter case, the pad-mangles are also said to have a vertically upward textile feed. Pad-mangles are described for example in Hans-Karl Rouette, "Handbuch der Textilveredlung", Deutscher Fachverlag 2003, pages 618 to 620.

Coating in accordance with the present invention may in another embodiment of the present invention may be accomplished for example by single or multiple spraying, bedrizzling, overpouring, printing, plasma deposition or pad-mangling.

Aqueous formulations for the purposes of the present invention may comprise one or more organic solvents, for example alcohols such as methanol, ethanol, isopropanol, ethylene glycol, diethylene glycol, triethylene glycol, acetone, methyl ethyl ketone, methyl isobutyl ketone, ethylene glycol mono-n-butyl ether, ethylene glycol monoisobutyl ether, acetic acid, n-butanol, isobutanol, n-hexanol and isomers, n-octanol and isomers, n-dodecanol and isomers. Organic solvents may comprise from 1% to 40% by weight and preferably from 2% to 25% by weight of the continuous phase of aqueous formulation used in accordance with the present invention. Aqueous formulations is to be understood as referring to such formulations where the continuous phase consists predominantly or, at the extreme, exclusively of water.

Coating is followed by a thermal treatment of the surface. The thermal treatment may effect drying. The thermal treatment may further effect crosslinking reactions. Preferably, the thermal treatment is carried out at a temperature below the melting point of core (a).

In one embodiment of the present invention, the thermal treatment may be carried out for example at temperatures in the range from 20 to 200° C.

The thermal treatment may be carried out at atmospheric pressure for example. It may also be carried out at reduced pressure, for example at a pressure in the range from 1 to 850 mbar.

The thermal treatment may utilize a heated or unheated stream of gas, in particular a heated or unheated stream of an inert gas such as nitrogen for example. To utilize a heated stream of gas, suitable temperatures range for example from 30 to 200° C., preferably from 120 to 180° C. and more preferably from 150 to 170° C.

The thermal treatment may be carried out continuously or batchwise. The duration of the thermal treatment can be chosen within wide limits. The thermal treatment can typically be carried out for a duration in the range from about 1 second to about 30 minutes and especially in the range from 10 seconds to 3 minutes.

In one embodiment of the present invention, thermal treatment can be carried out in two or more steps, in which case a lower treating temperature is chosen for the first step than for the second and if appropriate subsequent steps.

Hot air drying is an example of a specific suitable method of thermal treatment.

One embodiment of the present invention comprises practicing the process of the present invention by utilizing an aqueous formulation comprising one or more auxiliaries (D), for example up to 10% by weight, based on the entire preferably aqueous formulation. Especially when one or more textile surfaces are to be treated, it may be preferable to include one or more auxiliaries (D) in preferably aqueous formulation utilized for the purposes of the present invention, in which case auxiliaries (D) are selected from biocides, thickeners, foam inhibitors, wetting agents, plasticizers, hand modifiers (hand-modifying agents), fillers, crosslinkers (hardeners) and filmers.

An example of a biocide useful as an auxiliary (D) is 1,2-benzisothiazolin-3-one (BIT) (commercially available as Proxel® brands from Avecia Lim.) and its alkali metal salts; other suitable biocides are 2-methyl-2H-isothiazole-3 (MIT) and 5-chloro-2-methyl-2H-isothiazol-3-one (CIT). In general, from 10 to 150 ppm of biocide will be sufficient, based on preferably aqueous formulation.

Useful auxiliaries (D) further include one or more thickeners, which may be of natural or synthetic origin. Suitable synthetic thickeners are poly(meth)acrylic compounds, polycarboxylic acids, polyethers, polyimines, polyamides and polyurethanes, especially copolymers comprising 85% to 95% by weight of acrylic acid, 4% to 15% by weight of acrylamide and about 0.01% to 1% by weight of the (meth) acrylamide derivative of the formula V

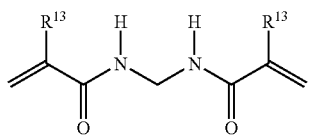

having molecular weights $M_w$ in the range from 100 000 to 200 000 g/mol, in each of which $R^{13}$ is methyl or preferably hydrogen. Examples of thickeners of natural origin are agar, carrageenan, modified starch and modified cellulose.

The amount of thickener included may be for example in the range from 0% to 10% by weight, preferably in the range from 0.05% to 5% by weight and more preferably in the range from 0.1% to 3% by weight, based on aqueous formulation used in the process of the present invention.

Examples of foam inhibitors useful as auxiliaries (D) are room temperature liquid silicones, nonethoxylated or singly or multiply ethoxylated.

Examples of wetting agents useful as auxiliaries (D) are alkylpolyglycosides, alkyl phosphonates, alkylphenyl phosphonates, alkyl phosphates and alkylphenyl phosphates.

Examples of plasticizers useful as auxiliaries (D) are ester compounds selected from the groups of the aliphatic or aromatic di- or polycarboxylic acids fully esterified with alkanols and of the at least singly alkanol-esterified phosphoric acid.

Alkanols are $C_1$-$C_{10}$-alkanols in one embodiment of the present invention.

Preferred examples of aromatic di- or polycarboxylic acids fully esterified with alkanol are fully alkanol-esterified phthalic acid, isophthalic acid and mellitic acid; specific examples are di-n-octyl phthalate, di-n-nonyl phthalate, di-n-decyl phthalate, di-n-octyl isophthalate, di-n-nonyl isophthalate, di-n-decyl isophthalate.

Preferred examples of aliphatic di- or polycarboxylic acids fully esterified with alkanol are for example dimethyl adipate, diethyl adipate, di-n-butyl adipate, diisobutyl adipate, dimethyl glutarate, diethyl glutarate, di-n-butyl glutarate, diisobutyl glutarate, dimethyl succinate, diethyl succinate, di-n-butyl succinate, diisobutyl succinate and also mixtures thereof.

Preferred examples of at least singly alkanol-esterified phosphoric acids are $C_1$-$C_{10}$-alkyl di-$C_6$-$C_{14}$-aryl phosphates such as isodecyl diphenyl phosphate.

Further suitable examples of plasticizers are aliphatic or aromatic di- or polyols at least singly esterified with $C_1$-$C_{10}$-alkylcarboxylic acid at least singly.

Preferred examples of aliphatic or aromatic di- or polyols at least singly esterified with $C_1$-$C_{10}$-alkylcarboxylic acid is 2,2,4-trimethylpentane-1,3-diol monoisobutyrate.

Further suitable plasticizers are polyesters obtainable by polycondensation of aliphatic dicarboxylic acid and aliphatic diol, for example adipic acid or succinic acid and 1,2-propanediol, preferably having an $M_w$ of 200 g/mol, and polypropylene glycol alkylphenyl ether, preferably having an $M_w$ of 450 g/mol.

Further suitable plasticizers are polypropylene glycols etherified with two different alcohols and having a molecular weight $M_w$ in the range from 400 to 800 g/mol, wherein preferably one of the alcohols may be an alkanol, especially a $C_1$-$C_{10}$-alkanol, and the other alcohol may preferably be an aromatic alcohol, for example o-cresol, m-cresol, p-cresol and especially phenol.

Examples of fillers useful as an auxiliary (D) are melamine and pigments in particulate form.

Examples of hand improvers useful as an auxiliary (D) are silicone emulsions, i.e., aqueous emulsions of silicones which may preferably bear hydrophilic groups such as for example OH groups or alkoxylate groups.

Examples of crosslinkers (hardeners) useful as an auxiliary (D) are condensation products of urea, glyoxal and formaldehyde, if appropriate etherified with preferably linear $C_1$-$C_4$-alkanol, especially doubly, triply or quadruply methanol- or ethanol-etherified

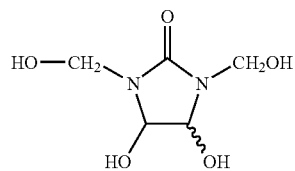

Crosslinkers (hardeners) useful as an auxiliary (D) further include isocyanurates and especially hydrophilicized isocyanurates and also mixed hydrophilicized diisocyanates/isocyanurates, for example the reaction product of $C_1$-$C_4$-alkyl polyethylene glycol with the isocyanurate of hexamethylene diisocyanate (HDI). Examples of suitable crosslinkers of this type are known from EP-A 0 486 881 for example.

Diethylene glycol is an example of a filmer (filming assistant) useful as an auxiliary (D).

In a further embodiment of the present invention, surface to be coated is provided with a primer (E) prior to the actual coating. Primer (E) preferably endows the surface to be coated in accordance with the present invention with a charge which is opposite to the charge of particles (A) or (A') (see hereinbelow) and in particular their envelope (b). When, for example, such particles (A) or (A') as have a cationic envelope (b) are to be used, it is advantageous to employ an anionic primer (E). When, however, such particles (A) or (A') as have an anionic envelope (b) are to be used, it is advantageous to employ a cationic primer (E).

Suitable primers (E) may be for example polymeric or nonpolymeric in nature. Suitable polymeric primers may for example have a number average molecular weight in the range from 5000 to 50 000 g/mol.

Useful cationic primers (E) include for example polyethyleneimine and especially aminosiloxanes such as for example siloxanes which have at least one $(CH_2)_w NH-R^{13}$ group in each of which w is an integer in the range from 1 to 10 and especially from 2 to 7 and $R^{13}$ is selected from hydrogen, preferably linear $C_1$-$C_4$-alkyl and $(CH_2)_w NH-R^{14}$, where $R^{14}$ is selected from hydrogen and preferably linear $C_1$-$C_4$-alkyl, also polyvinylimidazole. Further suitable cationic primers (E) are polymers of diallyl di-$C_1$-$C_4$-alkylammonium halide, in each of which $C_1$-$C_4$-alkyl is preferably linear.

Further suitable cationic primers (E) are reaction products of equimolar amounts of preferably cyclic diamines with epichlorohydrin and an alkylating agent such as for example dimethyl sulfate, $C_1$-$C_{10}$-alkyl halide, especially methyl iodide, or benzyl halide, especially benzyl chloride. Such reaction products may have molecular weights $M_w$ in the range from 1000 to 1 000 000 g/mol and are constructed as follows, illustrated with reference to the example of the reaction products of equimolar amounts of piperazine with epichlorohydrin and benzyl chloride:

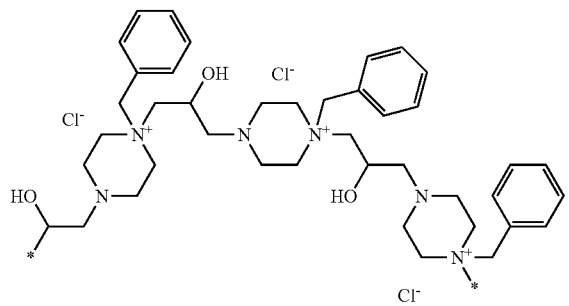

Suitable anionic primers (E) are for example homo- or copolymers of anionic monomers, especially of ethylenically unsaturated sulfonic acids, ethylenically unsaturated amine oxides or (meth)acrylic acid, if appropriate with one or more $C_1$-$C_{10}$-alkyl esters of (meth)acrylic acid. Further suitable anionic primers are for example anionic polyurethanes, i.e., herein such polyurethanes as comprise at least one sulfonic acid group or carboxylic acid group per molecule, preparable using 1,1-dimethylolpropionic acid for example.

To use one or more primers (E), it is preferable for it to be used in an aqueous formulation and to be applied prior to the coating with particles (A) or particles (A'). Suitable operating techniques include for example spraying, bedrizzling and especially pad-mangling.

The application of primer (E) and the coating with particles (A) or particles (A') may be respectively followed and preceded by thermal treatment, the conditions of thermal treatment corresponding to the conditions described above.

One embodiment of the present invention comprises applying a cationic primer (E) to cotton surface, treating thermally if appropriate and subsequently coating with anionic particles (A) or (A') and if appropriate at least one hydrophobicizing agent (B). Another embodiment of the present invention comprises applying no primer (E) to cotton surface and immediately coating with anionic particles (A) or (A') and if appropriate at least one hydrophobicizing agent (B). This is followed by thermal treatment in each case.

Another embodiment of the present invention comprises applying an anionic primer (E) to polyester surface, treating thermally if appropriate and subsequently coating with cationic particles (A) or (A') and if appropriate at least one hydrophobicizing agent (B). This is followed by thermal treatment.

The present invention further provides coated surfaces produced by the process of the present invention.

The present invention further provides surfaces coated with particles (A) comprising a core (a) and at least one envelope (b) other than core (a) and at least one hydrophobicizing agent (B).

Surfaces in accordance with the present invention can advantageously be produced by the above-described process of the present invention. Surfaces in accordance with the present invention are textured and repel water and have little tendency to soil.

One embodiment of the present invention comprises any emulsifier (C) or emulsifiers (C) used being applied only in traces, if at all, to surfaces of the present invention, and thus being essentially absent from the coated surfaces of the present invention.

One embodiment of the present invention comprises any auxiliary (D) or auxiliaries (D) used being applied only in traces, if at all, to surfaces of the present invention, and thus being essentially absent from the coated surfaces of the present invention.

In one embodiment of the present invention, surfaces of the present invention are characterized in that the treatment results in a coating which may be nonuniform or preferably uniform. Uniform is to be understood as meaning that the texturing is regular, while nonuniform means that the texturing is irregular, i.e., there are textured areas and nontextured areas on the surface.

In one embodiment of the present invention, surfaces in accordance with the present invention comprise a coating having an average thickness in the range from 50 nm to 5 μm, preferably in the range from 100 nm to 1 μm and more preferably up to 500 nm.

In one embodiment of the present invention, the coating applied in accordance with the present invention has an add-on in the range from 0.2 to 10 g/m² and preferably in the range from 1 to 2 g/m².

In one embodiment of the present invention, surfaces in accordance with the present invention are surfaces of textiles. Textile surfaces in accordance with the present invention do not just possess good hydrophobicity and are soil repellent, but also have good durabilities, especially durability to washing or laundering.

A further aspect of the present invention is an article having at least one surface which is in accordance with the present invention.

The present invention further provides particles (A') having a number average diameter in the range from 20 to 1000 nm, preferably in the range from 25 to 475 nm and more preferably in the range from 50 to 300 nm and comprising (a) a core comprising a crosslinked copolymer of at least one vinylaromatic compound,
(b) an envelope comprising a crosslinked or crosslinking-capable copolymer of at least one ethylenically unsaturated carboxylic acid or at least one ester or amide of an ethylenically unsaturated carboxylic acid,
said core (a) of said particles (A') having an average diameter in the range from 10 to 950 nm and preferably in the range from 15 to 450 nm and said core (a) and said envelope (b) being mutually different.

Particles (A') in accordance with the present invention and their core (a) and envelope (b) are subject to the aforementioned definitions.

In one specific embodiment of the present invention, core (a) or envelope (b) or core (a) and envelope (b) comprise an anionic and preferably a cationic copolymer or different anionic and preferably different cationic copolymers.

In one specific embodiment of the present invention, particles (A') in accordance with the present invention comprise a core-shell polymer, the shell corresponding to the envelope (b).

Particles (A') in accordance with the present invention are particularly useful for the present invention's process for coating surfaces. The present invention accordingly further provides for the use of particles (A') in accordance with the present invention for coating surfaces. The present invention further provides a process for coating surfaces using particles (A') in accordance with the present invention.

Particles (A') in accordance with the present invention can be prepared for example by emulsion polymerization, for example by stagewise emulsion polymerization or by emulsion polymerization in the gradient mode. The present invention accordingly further provides a process for producing particles (A') in accordance with the present invention by emulsion polymerization, hereinafter also referred to as inventive manufacturing process.

The inventive manufacturing process is preferably carried out using at least one initiator. At least one initiator may be a peroxide. Examples of suitable peroxides are alkali metal peroxodisulfates such as for example sodium peroxodisulfate, ammonium peroxodisulfate, hydrogen peroxide, organic peroxides such as diacetyl peroxide, di-tert-butyl peroxide, diamyl peroxide, dioctanoyl peroxide, didecanoyl peroxide, dilauroyl peroxide, dibenzoyl peroxide, bis(o-tolyl) peroxide, succinyl peroxide, tert-butyl peracetate, tert-butyl permaleate, tert-butyl perisobutyrate, tert-butyl perpivalate, tert-butyl peroctoate, tert-butyl perneodecanoate, tert-butyl perbenzoate, di-tert-butyl peroxide, tert-butyl hydroperoxide, cumene hydroperoxide, tert-butyl peroxi-2-ethylhexanoate and diisopropyl peroxidicarbamate. Also suitable are azo compounds such as for example azobisisobutyronitrile, azobis(2-amidopropane) dihydrochloride and 2,2'-azobis(2-methylbutyronitrile).

Redox initiators are likewise suitable for carrying out the inventive manufacturing process, consisting of peroxides and oxidizable sulfur compounds for example. Very particular preference is given to systems consisting of acetone bisulfite and organic peroxide such as tert-$C_4H_9$—OOH, $Na_2S_2O_5$ (sodium disulfite) and organic peroxide such as tert-$C_4H_9$—OOH or NaO—$CH_2SO_2H$ and organic peroxide such as tert-$C_4H_9$—OOH. Similarly, systems such as for example ascorbic acid/$H_2O_2$ are particularly preferred. The temperature chosen for conducting the inventive manufacturing process may be in the range from 20 to 105° C., preferably in the range from 50 to 85° C. The advantageously chosen temperature is dependent on the disintegration characteristics of the initiator or initiators used.

The pressure conditions for conducting the inventive manufacturing process are generally not critical in that for example pressures in the range from atmospheric pressure to 10 bar are suitable.

The inventive manufacturing process may be carried out using at least one emulsifier, which can be anionic, cationic or nonionic and selected from those enumerated as emulsifiers (C).

The duration chosen for conducting the inventive manufacturing process can be in the range from 30 minutes to 12 hours, and the range from 2 to 6 hours is preferred.

Various procedures can be chosen for carrying out the inventive manufacturing process, for example a batch (discontinuous) operation or semi- or fully continuous processes such as feed stream addition processes, which can also be operated in staged mode.

Seed procedures as described in the literature are contemplated as well. Seed procedure is particularly effective at producing particles (A') having a particle size distribution of particularly good reproducibility.

It is very particularly preferred to prepare a core (a) first, by emulsion polymerization. Core (a) is generated in particulate form in the reaction mixture. However, core (a) is left unpurified and the reaction mixture is mixed with comonomers, if appropriate further initiator or initiators and if appropriate emulsifier to produce in this way envelope (b) which is directly polymerized onto core (a).

Without preferring any one particular theory, it appears to be plausible that envelope (b) and core (a) are in many cases not just physically attached to each other but covalently linked to each other.

In one embodiment of the present invention, a deodorization is carried out after the production of particles (A') in accordance with the present invention, for example a chemical deodorization through addition of further initiator on completion of the addition of comonomer.

The present invention further provides aqueous formulations comprising particles (A) comprising a core (a) and at least one envelope (b) other than core (a), preferably particles (A') in accordance with the present invention, and optionally at least one hydrophobicizing agent (B). Aqueous formulations in accordance with the present invention give particularly good results in the above-described process of the present invention, and they are easily, for example by dilution with water, convertible into liquors or floats which likewise provide particularly good results in the process of the present invention.

In one embodiment of the present invention, aqueous formulations in accordance with the present invention comprise particles (A) comprising a core (a) and at least one envelope (b) other than core (a) and optionally at least one hydrophobicizing agent (B).

In one embodiment of the present invention, aqueous formulations in accordance with the present invention are characterized in that particles (A) have a number average diameter in the range from 20 to 1000 nm, preferably in the range from 25 to 475 nm and more preferably in the range from 50 to 300 nm.

In one embodiment of the present invention, aqueous formulations in accordance with the present invention are characterized in that core (a) comprises a crosslinked copolymer of at least one vinylaromatic compound.

In one embodiment of the present invention, aqueous formulations in accordance with the present invention are characterized in that particles (A) comprise an envelope (b) comprising a crosslinked or crosslinking-capable copolymer of at least one ethylenically unsaturated carboxylic acid or at least one ester or amide of an ethylenically unsaturated carboxylic acid.

In one embodiment of the present invention, aqueous formulations in accordance with the present invention are characterized in that core (a) or envelope (b) comprise an anionic copolymer but preferably a cationic copolymer.

In one embodiment of the present invention, aqueous formulations in accordance with the present invention may comprise one or more emulsifiers (C).

In one embodiment of the present invention, aqueous formulations in accordance with the present invention may comprise one or more auxiliaries (D).

Emulsifiers (C) and auxiliaries (D) can be selected from the above-described emulsifiers (C) and from the above-described auxiliaries (D), respectively.

In one embodiment of the present invention, aqueous formulations in accordance with the present invention are characterized in that particles (A) are selected from particles (A') which are in accordance with the present invention.

In one embodiment of the present invention, aqueous formulation in accordance with the present invention comprises
(A) 5% to 25% by weight of particles comprising a core (a) and at least one envelope (b) other than core (a), preferably 10% to 20% by weight,
(B) 0% to 15% by weight and preferably 0.1% to 10% by weight of hydrophobicizing agent,
(D) in total 0% to 50% by weight and preferably 1% to 25% by weight of auxiliaries, all based on entire formulation in accordance with the present invention.

In one embodiment of the present invention, aqueous formulations in accordance with the present invention have a pH in the range from 2 to 9 and preferably in the range from 3.5 to 7.5.

In one embodiment of the present invention, formulations in accordance with the present invention preferably have a solids content in the range from 10% to 70% by weight and more preferably in the range from 30% to 50% by weight.

In one embodiment of the present invention, preferably aqueous formulations in accordance with the present invention have a dynamic viscosity in the range from 50 to 5000 mPa·s, preferably in the range from 100 to 4000 mPa·s and more preferably in the range from 200 to 2000 mPa·s, measured with a Brookfield viscometer to DIN 51562-1 to 4 for example.

The present invention further provides a process for producing aqueous formulations which are in accordance with the present invention, hereinafter also referred to as inventive formulating process. The inventive formulating process is preferably carried out by mixing particles (A) comprising a core (a) and at least one envelope other than core (a), if appropriate hydrophobicizing agent (B), if appropriate one or more emulsifiers (C) and if appropriate one or more auxiliaries (D) with one another and with water by stirring for example.

The inventive formulating process can be carried out using any desired vessels, preferably stirred vessels.

The order of adding the components water and
particles (A) comprising a core (a) and at least one envelope other than core (a),
if appropriate hydrophobicizing agent (B),
if appropriate one or more emulsifiers (C), and
if appropriate one or more auxiliaries (D)
is generally not critical in the practice of the process. It is preferable if, first, water is introduced as an initial charge and then the components (A), (B) and if appropriate (D) are mixed in.

In one embodiment of the present manufacturing process, particles (A) are produced in the presence of emulsifier (C) and water and mixed with at least one hydrophobicizing agent (B) and if appropriate one or more auxiliaries (D).

The invention is illustrated by working examples.

The glass transition temperature $T_g$ was determined using a Mettler-Toledo TA8200 series DSC822 differential scanning calorimeter with a TSO 801 RO sample robot. The differential scanning calorimeter was equipped with an FSR5 temperature sensor. The method of DIN 53765 was followed.

Evaluation was based on the second heating curve in each case. Cool in each case down to −110° C., heating rate: 20° C./min, heat up to 150° C., maintain at 150° C. for 5 minutes, then cool down to −110° C., heating rate: 20° C./min, heat up to 150° C.

The particle diameter distribution of particles (A') in accordance with the present invention was in each case determined in accordance with ISO 13321 using a Malvern Coulter Counter.

I. Production of Inventive Particles and Inventive Formulations

I.1. Production of Inventive Particles (A'.1)

The following mixtures were prepared:
Mixture I.1.1:
102 g of completely ion-free water
156 g of styrene, 48 g of allyl methacrylate,
7.2 g of compound IV.1 as 40% by weight solution in water $$R^{11.1}-[N(CH_2CH_2O)_6H]_2 \qquad IV.1$$

where $R^{11.1}$ is cis-$(CH_2)_8$—CH=CH—$(CH_2)_7CH_3$.
7.2 g of N,N-dimethylaminopropylmethacrylamide ("DMAPMAM"),

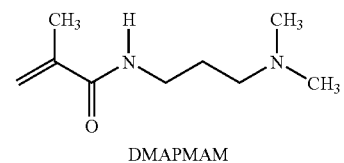

DMAPMAM adjusted to pH 4.0 with phosphoric acid.
Mixture I.1.2: 4.8 g of 2,2'-azobis(2-amidinopropane) dihydrochloride in 91 ml of Completely Ion-Free Water
Mixture I.1.3:
372 g of completely ion-free water
126 g of styrene, 220.7 g of n-butyl acrylate, 2.5 g of freshly distilled acrylic acid,
10.8 g of N-methylolmethacrylamide, dissolved in 61.2 g of water,
7.2 g of compound IV.1 as 40% by weight solution in water
Mixture I.1.4: 3.6 g of 2,2'-azobis(2-amidinopropane) dihydrochloride in 68 ml of Completely Ion-Free Water A 5 l tank equipped with anchor stirrer, nitrogen connection and three metering devices was charged with an emulsion comprising 265 ml of completely ion-free water, 24 g of styrene, 4.8 g of N,N-dimethylaminopropylmethacrylamide, 4.1 g of compound IV.1 (dissolved in 6.12 ml of water), 0.2 g of HO—$CH_2SO_2Na$ and 0.3 g of a 70% by weight aqueous solution of tert-butyl hydroperoxide. A pH of 4.0 was set with phosphoric acid. Thereafter, nitrogen was passed through the resulting emulsion for a quarter of an hour. The emulsion was subsequently heated to 75° C.

The simultaneous addition was then commenced of mixture I.1.1 and I.1.2. Mixture I.1.1 was added within 2 hours, mixture I.1.2 within 2 hours 15 minutes. The temperature was maintained at 75° C. during the addition. Envelope (a.1) was obtained.

The simultaneous addition was then commenced of mixture I.1.3 and I.1.4. Mixture I.1.3 was added within 2 hours, mixture I.1.4 within 2 hours 15 minutes. The temperature was maintained at 75° C. during the addition. Envelope (b.1) was obtained.

Completion of the addition was followed by 30 minutes of stirring at 75° C. and subsequently, for deodorization, by the simultaneous metered addition of a solution of 1.05 g of tert-butyl hydroperoxide (70% by weight in water), diluted with 10 ml of distilled water, and of a solution of 1.04 g of acetone disulfite (13% by weight in water), diluted with 10 ml of distilled water, over a period of 90 minutes.

This was followed by cooling down to room temperature. The dispersion thus obtainable was subsequently filtered through a 125 μm net. The filtration took 4 minutes. It removed about 2 g of coagulum.

This gave dispersion WD.1 having a pH of 3.7 and comprising inventive particles (A'.1). The solids content was 37.2% by weight, the dynamic viscosity was 32 mPa·s. Particle diameter distribution: maximum at 268 nm.

I.2. Production of Inventive Particles (A'.2)

The following mixtures were prepared:
Mixture I.2.1:
193 g of completely ion-free water
228.9 g of styrene, 60 g of allyl methacrylate, 2.1 g of acrylic acid
6 g of compound IV.1 in 11 ml of water
9.0 g of N,N-dimethylaminopropylmethacrylamide
adjusted to pH 4.0 with phosphoric acid.
Mixture I.2.2: 1.5 g of 2,2'-azobis(2-amidinopropane) dihydrochloride in 100 ml of Completely Ion-Free Water
Mixture I.2.3:
278 g of completely ion-free water
96 g of styrene, 183.9 g of n-butyl acrylate, 2.1 g of freshly distilled acrylic acid,
9 g of N-methylolmethacrylamide, dissolved in 51 g of water,
9 g of N,N-dimethylaminopropylmethacrylamide
6 g of compound IV.1 in 11 ml of water
Mixture I.2.4: 1.5 g of 2,2'-azobis(2-amidinopropane) dihydrochloride in 100 ml of Completely Ion-Free Water A 5 l tank equipped with anchor stirrer, nitrogen connection and three metering devices was charged with an emulsion comprising 200 ml of completely ion-free water, 4.1 g of compound IV.1 (dissolved in 6.12 ml of water), 50.8 g of mixture I.2.1 and 10.2 g of mixture I.2.2. A pH of 4.0 was set with phosphoric acid. Thereafter, nitrogen was passed through the resulting emulsion for a quarter of an hour. The emulsion was subsequently heated to 75° C.

The simultaneous addition was then commenced of the remainder of mixture I.2.1 and mixture I.2.2. The remainder of mixture I.2.1 was added within 2 hours, the remainder of mixture I.2.2 within 2 hours 15 minutes. The temperature was maintained at 75° C. during the addition. Envelope (a.2) was obtained.

The simultaneous addition was then commenced of mixture I.2.3 and I.2.4. Mixture I.2.3 was added within 2 hours, mixture I.2.4 within 2 hours 15 minutes. The temperature was maintained at 75° C. during the addition. Envelope (b.2) was obtained.

Completion of the addition was followed by 30 minutes of stirring at 75° C. and subsequently, for deodorization, by the simultaneous metered addition of a solution of 0.91 g of tert-butyl hydroperoxide (70% by weight in water), diluted with 30 ml of distilled water, and of a solution of 1.04 g of acetone disulfite (13% by weight in water), diluted with 30 ml of distilled water, over a period of 90 minutes.

This was followed by cooling down to room temperature. The dispersion thus obtainable was subsequently filtered through a 125 μm net. The filtration took 4 minutes. It removed about 1 g of coagulum.

This gave dispersion WD.2 having a pH of 3.7 and comprising inventive particles (A'.2). The solids content was 37.6% by weight, the dynamic viscosity was 30 mPa·s. Particle diameter distribution: maximum at 116 nm.

I.3 Production of Inventive Particles (A'.3)

The following mixtures were prepared:
Mixture I.3.1:
251 g of completely ion-free water
274.7 g of styrene, 72 g of allyl methacrylate, 2.5 g of acrylic acid,
7.2 g of compound IV.1 in 11 ml of water
10.8 g of N,N-dimethylaminopropylmethacrylamide
adjusted to pH 4.0 with formic acid.
Mixture I.3.2: 1.8 g of 2,2'-azobis(2-amidinopropane) dihydrochloride in 100 ml of Completely Ion-Free Water
Mixture I.3.3:
190 g of completely ion-free water
76.8 g of styrene, 147.1 g of n-butyl acrylate, 1.7 g of freshly distilled acrylic acid,
7.2 g of N-methylolmethacrylamide, dissolved in 40.8 g of water,
7.2 g of N,N-dimethylaminopropylmethacrylamide
4.8 g of compound IV.1 in 7.2 ml of water
Mixture I.3.4: 1.2 g of 2,2'-azobis(2-amidinopropane) dihydrochloride in 100 ml of Completely Ion-Free Water A 5 l tank equipped with anchor stirrer, nitrogen connection and three metering devices was charged with an emulsion comprising 240 ml of completely ion-free water, 3.6 g of compound IV.1 (dissolved in 5.4 ml of water), 63 g of mixture I.3.1 and mixture I.3.2. A pH of 4.0 was set with formic acid. Thereafter, nitrogen was passed through the resulting emulsion for a quarter of an hour. The emulsion was subsequently heated to 75° C.

The simultaneous addition was then commenced of the remainder of mixture I.3.1 and mixture I.3.2. The remainder of mixture I.3.1 was added within 2 hours, the remainder of mixture I.3.2 within 2 hours 15 minutes. The temperature was maintained at 75° C. during the addition. Envelope (a.3) was obtained.

The simultaneous addition was then commenced of mixture I.3.3 and I.3.4. Mixture I.3.3 was added within 2 hours, mixture I.3.4 within 2 hours 15 minutes. The temperature was maintained at 75° C. during the addition. Envelope (b.3) was obtained.

Completion of the addition was followed by 30 minutes of stirring at 75° C. and subsequently, for deodorization, by the simultaneous metered addition of a solution of 0.91 g of tert-butyl hydroperoxide (70% by weight in water), diluted with 30 ml of distilled water, and of a solution of 1.04 g of acetone disulfite (13% by weight in water), diluted with 30 ml of distilled water, over a period of 90 minutes.

This was followed by cooling down to room temperature. The dispersion thus obtainable was subsequently filtered through a 125 μm net. The filtration took 4 minutes. It removed about 2 g of coagulum.

This gave dispersion WD.3 having a pH of 3.8 and comprising inventive particles (A'.3). The solids content was 37.6% by weight, the dynamic viscosity was 30 mPa·s. Particle diameter distribution: maximum at 115 nm.

I.4 Production of Inventive Particles (A'.4)

The following mixtures were prepared:

Mixture I.4.1:
300 g of completely ion-free water
320.5 g of styrene, 84 g of allyl methacrylate, 2.9 g of acrylic acid,
8.4 g of compound IV.1 in 11 ml of water
12.6 g of N,N-dimethylaminopropylmethacrylamide
adjusted to pH 4.0 with formic acid.
Mixture I.4.2: 2.1 g of 2,2'-azobis(2-amidinopropane) dihydrochloride in 100 ml of Completely Ion-Free Water
Mixture I.4.3:
123 g of completely ion-free water
57.6 g of styrene, 110.3 g of n-butyl acrylate, 1.3 g of freshly distilled acrylic acid,
5.4 g of N-methylolmethacrylamide, dissolved in 30.6 g of water,
5.4 g of N,N-dimethylaminopropylmethacrylamide
3.6 g of compound IV.1 in 5.4 ml of water
Mixture I.4.4: 0.9 g of 2,2'-azobis(2-amidinopropane) dihydrochloride in 100 ml of Completely Ion-Free Water A 5 l tank equipped with anchor stirrer, nitrogen connection and three metering devices was charged with an emulsion comprising 290 ml of completely ion-free water, 4.2 g of compound IV.1 (dissolved in 6.3 ml of water), 74 g of mixture I.4.1 and 10.2 g of mixture I.4.2. A pH of 4.0 was set with formic acid. Thereafter, nitrogen was passed through the resulting emulsion for a quarter of an hour. The emulsion was subsequently heated to 75° C.

The simultaneous addition was then commenced of the remainder of mixture I.4.1 and mixture I.4.2. The remainder of mixture I.4.1 was added within 2 hours, the remainder of mixture I.4.2 within 2 hours 15 minutes. The temperature was maintained at 75° C. during the addition. Envelope (a.4) was obtained.

The simultaneous addition was then commenced of mixture I.4.3 and I.4.4. Mixture I.4.3 was added within 2 hours, mixture I.4.4 within 2 hours 15 minutes. The temperature was maintained at 75° C. during the addition. Envelope (b.4) was obtained.

Completion of the addition was followed by 30 minutes of stirring at 75° C. and subsequently, for deodorization, by the simultaneous metered addition of a solution of 0.56 g of tert-butyl hydroperoxide (70% by weight in water), diluted with 30 ml of distilled water, and of a solution of 0.55 g of acetone disulfite (13% by weight in water), diluted with 30 ml of distilled water, over a period of 90 minutes.

This was followed by cooling down to room temperature. The dispersion thus obtainable was subsequently filtered through a 125 μm net. The filtration took 4 minutes. It removed about 2 g of coagulum.

This gave dispersion WD.4 having a pH of 3.6 and comprising inventive particles (A'.4). The solids content was 37.7% by weight, the dynamic viscosity was 30 mPa·s. Particle diameter distribution: maximum at 116 nm.

I.5 Production of Inventive Particles (A'.5)

The following mixtures were prepared:

Mixture I.5.1:
134 g of completely ion-free water
183.1 g of styrene, 48 g of allyl methacrylate, 1.7 g of acrylic acid,
4.8 g of compound IV.1 in 7.2 ml of water
7.2 g of N,N-dimethylaminopropylmethacrylamide
adjusted to pH 4.0 with formic acid.
Mixture I.5.2: 1.2 g of 2,2'-azobis(2-amidinopropane) dihydrochloride in 100 ml of completely Ion-Free Water
Mixture I.5.3:
366 g of completely ion-free water
115.2 g of styrene, 220.7 g of n-butyl acrylate, 2.5 g of freshly distilled acrylic acid,
10.8 g of N-methylolmethacrylamide, dissolved in 61.2 g of water,
7.2 g of compound IV.1 in 10.8 ml of water
10.8 g of N,N-dimethylaminopropylmethacrylamide
Mixture I.5.4: 1.8 g of 2,2'-azobis(2-amidinopropane) dihydrochloride in 100 ml of Completely Ion-Free Water A 5 l tank equipped with anchor stirrer, nitrogen connection and three metering devices was charged with an emulsion comprising 180 ml of completely ion-free water, 2.4 g of compound IV.1 (dissolved in 3.6 ml of water), 39 g of mixture I.5.1 and 8.1 g of mixture I.5.2. A pH of 4.0 was set with formic acid. Thereafter, nitrogen was passed through the resulting emulsion for a quarter of an hour. The emulsion was subsequently heated to 75° C.

The simultaneous addition was then commenced of the remainder of mixture I.5.1 and mixture I.5.2. The remainder of mixture I.5.1 was added within 2 hours, the remainder of mixture I.5.2 within 2 hours 15 minutes. The temperature was maintained at 75° C. during the addition. Envelope (a.5) was obtained.

The simultaneous addition was then commenced of mixture I.5.3 and I.5.4. Mixture I.5.3 was added within 2 hours, mixture I.5.4 within 2 hours 15 minutes. The temperature was maintained at 75° C. during the addition. Envelope (b.5) was obtained.

Completion of the addition was followed by 30 minutes of stirring at 75° C. and subsequently, for deodorization, by the simultaneous metered addition of a solution of 0.75 g of tert-butyl hydroperoxide (70% by weight in water), diluted with 30 ml of distilled water, and of a solution of 1.08 g of acetone disulfite (13% by weight in water), diluted with 30 ml of distilled water, over a period of 90 minutes.

This was followed by cooling down to room temperature. The dispersion thus obtainable was subsequently filtered through a 125 μm net. The filtration took 4 minutes. It removed about 3 g of coagulum.

This gave dispersion WD.5 having a pH of 3.6 and comprising inventive particles (A'.5). The solids content was 37.1% by weight, the dynamic viscosity was 35 mPa·s. Particle diameter distribution: maximum at 121 nm.

I.6 Production of Inventive Particles (A'.6) to (A'.8)

General prescription illustrated for (A'.8)

The following mixtures were prepared:

Mixture I.8.1:
145 g of completely ion-free water
17.1 g of 28% by weight aqueous solution of

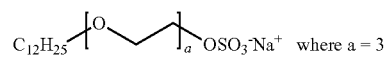

190.3 g of styrene (79.3% by weight), 1.7 g (0.7% by weight) of acrylic acid,
48 g of 1,4-butanediol diacrylate (in total: 240 g of comonomers for core).
Mixture I.8.2: 1.2 g of $Na_2S_2O_8$ in 100 ml of Completely Ion-Free Water
Mixture I.8.3:
355 g of completely ion-free water
16.1 g of 28% by weight aqueous solution of

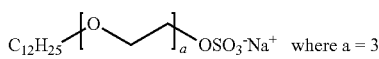

$C_{12}H_{25}\!-\!\!\left[O\diagdown\diagup\right]_a\!\!\diagdown\!OSO_3^-Na^+$ where a = 3

126 g of styrene, 220.7 g of n-butyl acrylate (61.3% by weight), 2.5 g (0.7% by weight) of acrylic acid,
10.8 g of N-methylolmethacrylamide, dissolved in 61.2 g of water,
7.2 g of compound IV.1 as 40% by weight solution in water (in total: 360 g of comonomers for the envelope)
Mixture I.8.4: 1.8 g of $Na_2S_2O_8$ in 100 ml of Completely Ion-Free Water A 5 l tank equipped with anchor stirrer, nitrogen connection and three metering devices was charged with an suspension comprising 140 ml of completely ion-free water and 29.1 g of a 33% by weight polystyrene seed (average diameter 30 nm, in water) Nitrogen was passed through the suspension for an hour. The suspension was subsequently heated to 75° C.

The simultaneous addition was then commenced of mixture I.8.1 and I.8.2. Mixture I.8.1 was added within 2 hours, mixture I.8.2 within 2 hours 15 minutes. The temperature was maintained at 75° C. during the addition. Envelope (a.8) was obtained.

The simultaneous addition was then commenced of mixture I.8.3 and I.8.4. Mixture I.8.3 was added within 2 hours, mixture I.8.4 within 2 hours 15 minutes. The temperature was maintained at 75° C. during the addition. Envelope (b.8) was obtained.

Completion of the addition was followed by 30 minutes of stirring at 75° C. and subsequently, for deodorization, by the simultaneous metered addition of a solution of 1.05 g of tert-butyl hydroperoxide (70% by weight in water), diluted with 10 ml of distilled water, and of a solution of 1.04 g of acetone disulfite (13% by weight in water), diluted with 10 ml of distilled water, over a period of 90 minutes.

This was followed by cooling down to room temperature. The dispersion thus obtainable was subsequently filtered through a 125 μm net. The filtration took 4 minutes. It removed about 1 g of coagulum.

This gave dispersion WD.8 having a pH of 6.2 and comprising inventive particles (A'.8). The solids content was 37.9% by weight, the dynamic viscosity was 30 mPa·s. Particle diameter distribution: maximum at 142 nm.

To produce inventive particles (A'.6) and (A'.7), the above recipe was varied with Table 1: in each case more acrylic acid was used in mixtures I.8.1 and I.8.3 and, correspondingly, the amount of styrene (in mixture I.8.1) and n-butyl acrylate in mixture I.8.3) was reduced. Furthermore, in each case 300 g of comonomers were used for core and 300 g of comonomers for the envelope, the amounts of the materials used in the mixtures I.8.1 and I.8.3 being changed appropriately. The mixing ratios of the other ingredients in mixtures I.8.1 and I.8.3 remained unchanged.

TABLE 1

Recipes for producing inventive particles (A'.6), (A'.7) and (A'.8)

| Example | | AS for core | AS for envelope | Styrene for core | n-BA for envelope | Particle diameter [nm] |
|---|---|---|---|---|---|---|
| (A'.6) | WD.6 | 3% | 3% | 77% | 59% | 136 |
| (A'.7) | WD.7 | 5% | 5% | 75% | 57% | 136 |
| (A'.8) | WD.8 | 0.7% | 0.7% | 79.3% | 61.3% | 142 |

Abbreviations:
n-BA: n-butyl acrylate,
AS: acrylic acid
%ages at AS or styrene for core are based on total comonomers for core, and at AS or n-BA for envelope are based on total comonomers for envelope.
% is always by weight, unless expressly stated otherwise.

Inventive particles (A'.6) to (A'.8) are anionic particles.

I.9 Preparation of an Anionic Primer ($E_A.1$)

The following mixtures were prepared:
Mixture I.9.1:
146 g of completely ion-free water
130.8 g of styrene, 245.2 g of n-butyl acrylate, 12 g of acrylic acid,
17.9 g of 28% by weight aqueous solution of n-$C_{12}H_{25}$($OCH_2CH_2$)$_3OSO_3Na$
12 g of N-methylolmethacrylamide dissolved in 68 g of water,
Mixture I.9.2: 0.6 g of $Na_2S_2O_8$ in 100 ml of Completely Ion-Free Water
Mixture I.9.3: 0.4 g of HO—$CH_2SO_2$Na in 100 ml of Completely Ion-Free Water A 5 l tank equipped with stirrer, nitrogen connection and three metering devices was charged with a suspension comprising 160 ml of completely ion-free water and 9.1 g of a 33% by weight polystyrene seed (average diameter 30 nm, in water). Nitrogen was passed through the suspension for an hour. The suspension was then heated to 75° C.

Thereafter, the simultaneous addition was commenced of mixtures I.9.1, I.9.2 and I.9.3. Mixture I.9.1 was added within 3 hours, mixtures I.9.2 and I.9.3 each within 3 hours 15 minutes. The temperature was maintained at 75° C. during the addition.

Completion of the addition was followed by 30 minutes of stirring at 75° C. and subsequently, for deodorization, by the simultaneous metered addition of a solution of 1.2 g of tert-butyl hydroperoxide (70% by weight in water), diluted with 22 ml of distilled water, and of a solution of 0.8 g of HO—$CH_2SO_2$Na, diluted with 25 ml of distilled water, over a period of 90 minutes.

The batch was subsequently cooled down to room temperature and adjusted to pH 5.1 with 25% by weight aqueous ammonia. The dispersion thus obtainable was subsequently filtered through a 125 μm net. The filtration took 4 minutes. It removed about 1 g of coagulum.

This gave primer ($E_A.1$) in aqueous dispersion with a pH of 7.5. The solids content was 39.6% by weight, the dynamic viscosity was 310 mPa·s. Particle diameter distribution: maximum at 216 nm.

I.10 Production of Inventive Aqueous Formulations (General Working Prescription)

The following ingredients in accordance with Table 2 were mixed in a stirred vessel:
inventive particles (A') in the form of an aqueous dispersion,
random copolymer of 10% by weight of methacrylic acid and 90% by weight of $CH_2$=CHCOO—$CH_2$—$CH_2$—O-n-$C_6F_{13}$ of $M_n$ 30 000 g/mol (GPC) in aqueous dispersion (20% by weight solids content) (B1.1) or
paraffin wax (unbranched, melting range 65-70° C., average number of carbon atoms per molecule: 40) (B2.1)
auxiliaries (D): in accordance with Table 2.

The mixture was made up to 1 l with water to obtain inventive aqueous formulations F.1 to F.9.

Inventive particles (A') in inventive aqueous formulations had no tendency to agglomerate.

TABLE 2

Production of inventive formulations

| Number | g (WD) | g (A') | g (B) | g (C) | g (D) |
|---|---|---|---|---|---|
| F.1 | 530 g WD.2 | 199.3 (A'.2) | 71.4 g (B1.1) | * | — |

TABLE 2-continued

Production of inventive formulations

| Number | g (WD) | g (A') | g (B) | g (C) | g (D) |
|---|---|---|---|---|---|
| F.2 | 230 g WD.2 | 86.4 (A'.2) | 114 g (B2.1), 48 g (B3.1) | *, 7.5 g (C.1) | (D.1), (D.2) |
| F.3 | 230 g WD.3 | 86.4 (A'.3) | 114 g (B2.1), 48 g (B3.1) | *, 7.5 g (C.1) | (D.1), (D.2) |
| F.4 | 230 g WD.5 | 85.3 (A'.5) | 114 g (B2.1), 48 g (B3.1) | *, 7.5 g (C.1) | (D.1), (D.2) |
| F.5 | 473 g WD.7 | 179.3 (A'.7) | 76.0 g (B1.1) | ** | — |

*inventive aqueous formulation comprises compound IV.1 from WD.2 or WD.3 or WD.5
**inventive aqueous formulation comprises n-$C_{12}H_{25}(OCH_2CH_2)_3OSO_3Na$ from WD.7

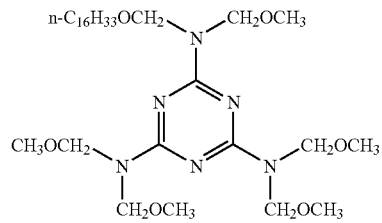

(B3.1)

(C.1): Reaction product of oleylamine with 6 equivalents of ethylene oxide
(D.1): 13 g of white oil,
(D.2): 210 g of the compound

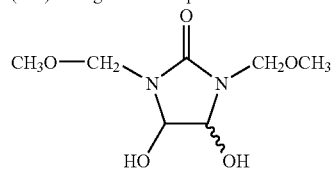

II. Inventive Treatment of Surfaces
II.1 Tests Involving Textile Surfaces
The following textiles were used:
Cotton: 1 m 30 cm, 100% woven cotton, bleached, nonmercerized, twill construction, basis weight 196 g/m² ("Co")
Polyester: 1 m 30 cm, woven polyester staple fiber, basis weight 220 g/m² ("PES")
The following equipment was used in all cases:
Pad-mangle: manufactured by Mathis, model HVF12085, contact pressure 1-3 bar. The contact pressure setting in all cases was such that the wet pickup (based on weight of fiber) was 60% in the case of polyester and 90% in the case of cotton, unless otherwise stated. The liquor was at room temperature, unless otherwise stated.
Dryer: continuous dryer from Mathis THN 12589
Test Methods:
Spray test: AATCC 22-2001, Oil rating: AATCC 118-2002, Hydrophobicization: AATCC 193-2004, Smoothness: AATCC 124-2001
Wash conditions: delicates cycle at 30° C., 15 g/l of a mild laundry detergent,
Washing machine: Miele Novotronic T440C, Setting: tumbler dry, hand iron moist.
II.2.1 One-Staged Application Process
II.2.1.1 One-Staged Application Process on Nonprimered Textile
Textile (Co or PES, primered or nonprimered) was padded with an aqueous liquor produced by making up inventive aqueous formulation according to Tables 2 and 3 with water. The padding speed was 2 m/min. The textile thus treated was subsequently dried on a tenter at 110° C. for two minutes to a residual moisture content of 6% to 8% by weight in each case.

This was followed by thermal treatment at 160° C. in a dryer for two minutes to obtain inventive treated cotton fabric or polyester fabric.
To produce Co.2, the thermal treatment was carried out at 150° C. for 4 minutes (instead of for 2 minutes at 160° C.).
II.2.1.2 Production of Primered Cotton and Subsequent Inventive Treatment
Textile (Co) was initially padded with an aqueous liquor comprising 0.8% by weight (on weight of fiber) of a cationic primer ($E_K$.1), prepared by reacting equimolar amounts of epichlorohydrin with piperazine and benzyl chloride, molecular weight $M_w$ 15 000 g/mol. This was followed by drying on a tenter at 110° C. for two minutes and subsequent padding with a liquor comprising inventive aqueous formulation F.7, under the conditions identified above. Then, the textile thus treated was dried on a tenter at 110° C. for two minutes to a residual moisture content of 6% to 8% by weight in each case.
This was followed by thermal treatment at 160° C. in a dryer for two minutes to obtain inventive treated cotton fabric Co.3.
The results of performance testing are given in Table 4.
II.2.1.3 Production of Primered Polyester Fabric and Subsequent Inventive Treatment
Polyester fabric (PES) was initially padded with an aqueous liquor comprising 0.5% by weight (on weight of fiber) of the anionic primer $E_A$.1. This was followed by drying on a tenter at 110° C. for two minutes and subsequent padding with a liquor comprising inventive aqueous formulation F.1, under the conditions identified above. Then, the textile thus treated was dried on a tenter at 110° C. for two minutes to a residual moisture content of 6% to 8% by weight in each case.
This was followed by thermal treatment at 160° C. in a dryer for two minutes to obtain inventive treated polyester fabric PES.1.
The results of performance testing are given in Table 4.
II.2.2 Two-Stage Inventive Treatment
A hydrophilicized isocyanurate/diisocyanate from Example 4 of EP 0 486 881 was used as auxiliary (D.4).
II.2.2.1 Two-Stage Inventive Treatment of Nonprimered Cotton
Cotton fabric (Co) was initially padded with an aqueous liquor comprising aqueous dispersion of Table 1 and Table 3 and also 5% by weight, on weight of fiber, of auxiliary (D.4) (step 1). The padding speed was 2 m/min. Then, the Co thus treated was dried on a tenter at 110° C. for two minutes.
This was followed by padding with an aqueous liquor comprising 56.7 g/l of hydrophobicizing agent (B1.1). The nip pressure was adjusted to produce a wet pickup of 90% (step 2).
Thereafter, the Co thus treated was thermally treated in a dryer at 160° C. for 2 min to obtain the inventive treated Co.4 to Co.8.
To perform the comparative experiment, the inventive formulation was omitted in step 1 and the padding was only carried out with a liquor comprising (D.4). The rest of the procedure was as described above. The comparative textile V-Co.9 was obtained.
II.2.2.2 Two-Stage Inventive Treatment of Primered Polyester
Polyester fabric (PES) was initially padded with an aqueous liquor comprising 0.5% by weight (on weight of fiber) of the anionic primer $E_A$.1. This was followed by drying on a tenter at 110° C. for two minutes and subsequent padding with a liquor comprising inventive aqueous formulation of Table 4 and also 5% by weight, on weight of fiber, of auxiliary (D.4) (step 1). The padding speed was 2 m/min. The PES thus treated was subsequently dried on a tenter at 110° C. for two minutes.

This was followed by padding with an aqueous liquor comprising 56.7 g/l of hydrophobicizing agent (B1.1). The nip pressure was adjusted to produce a wet pickup of 60% (step 2).

Thereafter, the PES thus treated was thermally treated in a dryer at 160° C. for 2 min to obtain the inventive treated PES.2.

II.2.2.3 Two-Stage Inventive Treatment of Primered Cotton

Textile (Co) was initially padded with an aqueous liquor comprising 5 g/l (corresponding to 0.2% by weight, on weight of fiber) of a cationic primer ($E_K$-1), prepared by reacting equimolar amounts of epichlorohydrin with piperazine and benzyl chloride, molecular weight $M_w$ 15 000 g/mol. This was followed by thermal treatment in a dryer at 140° C. for two minutes and subsequent padding with a liquor comprising aqueous dispersion WD.6 and 5% by weight, on weight of fiber, of auxiliary (D.4), to a wet pickup of 90% (step 1). The Co thus treated was subsequently dried on a tenter at 110° C. for two minutes to a residual moisture content of 6% to 8% by weight in each case.

This was followed by padding with an aqueous liquor comprising 56.7 g/l of hydrophobicizing agent (B1.1). The nip pressure was adjusted to produce a wet pickup of 90% (step 2).

This was followed by thermal treatment in the dryer at 160° C. for two minutes to obtain inventive treated cotton fabric Co.10.

To produce Co.11, the above was repeated except that an aqueous liquor comprising 12.5 g/l of the abovementioned cationic primer was used.

Explanation concerning Tables 3 and 4:

Dynamic Roll-Off Angle (Water Repellency)

The textile sample (size about 10·10 cm) was laid or adhered without creases on an inclined table. Angles of inclination in the range from 1° to 75° can be set in a defined manner using the inclined table. To determine the minimal roll-off angle, initially a large angle of inclination was used to determine the bead-off behavior of water droplets. To this end, one drop of water (12 mg) at a time was dripped onto the sample from a disposable hypodermic having a 0.4 mm cannula. When angles of inclination are large, the water droplets always roll off. The angle of inclination was then incrementally reduced, and at each angle setting water droplets were dripped on to see whether they rolled off. In this way, the minimum angle of inclination was determined at which at least 3 of 5 water droplets dripped onto 5 different places of the sample rolled off. This angle of inclination was reported as dynamic roll-off angle.

TABLE 3

Inventive treatment of nonprimered textile

| No. | Stage 1 | Stage 2 | Dyn. roll-off angle [°] | Oil rating | Hydroph. | Oil rating/10 | Hydroph./10 | Spray test | Smoothness |
|---|---|---|---|---|---|---|---|---|---|
| Co.1 | F.1 (80 g/l) | — | 21 | 7 | 10 | 5 | 9 | n.d. | n.d. |
| Co.2 | F.2 (200 g/l) | — | 14 | 7 | 2 | n.d. | n.d. | 95 | DP 3 |
| Co.4 | F.2 (150 g/l), (D.4) | (B1.1) (5.7 g/l) | 16 | 7 | 10 | 6 | 10 | n.d. | n.d. |
| Co.5 | F.3 (150 g/l), (D.4) | (B1.1) (5.7 g/l) | 18 | 7 | 10 | 6 | 10 | n.d. | n.d. |
| Co.6 | F.1 (190 g/l), (D.4) | (B1.1) (5.7 g/l) | 15 | 7 | 10 | 6 | 10 | n.d. | n.d. |
| Co.7 | F.2 (115 g/l), (D.4) | (B1.1) (5.7 g/l) | 13 | 6 | 10 | 6 | 10 | n.d. | n.d. |
| Co.8 | F.2 (77 g/l), (D.4) | (B1.1) (5.7 g/l) | 9 | 7 | 10 | 6 | 9 | n.d. | n.d. |
| V-Co.9 | (D.4) | (B1.1) (5.7 g/l) | 10 | 2 | 3 | 1 | 1 | n.d. | n.d. |

Abbreviations:
n.d.: not determined.
Hydroph.: hydrophobicization
Oil rating/10: oil rating after 10 domestic washes
Hydroph./10: hydrophobicization after 10 domestic washes

TABLE 4

Inventive treatment of primered textile

| No. | Stage 1 | Stage 2 | Dyn. roll-off angle [°] | Oil rating | Hydroph. | Oil rating/10 | Hydroph./10 | Spray test | Smoothness |
|---|---|---|---|---|---|---|---|---|---|
| Co.3 | F.7 (75 g/l) | — | 17 | 6 | 9 | 5 | 8 | n.d. | n.d. |
| PES.1 | F.1 (110 g/l) | — | 14 | 5 | 10 | 5 | 8 | n.d. | n.d. |
| PES.2 | WD.3 (50 g/l) | (B1.1) 11.4 g/l | 13 | 6 | 10 | 5 | 9 | n.d. | n.d. |
| Co.10 | WD.6 (45.1 g/l) (D.4) | (B1.1) (5.7 g/l) | 10 | 5 | 9 | 4 | 8 | n.d. | n.d. |
| Co.11 | WD.6 (45.1 g/l) (D.4) | (B1.1) (5.7 g/l) | 11 | 5 | 9 | 5 | 8 | n.d. | n.d. |

Inventive textiles Co.1 to Co.11 were also easy iron.

We claim:

1. A process for coating a surface, which comprises coating said surface with particles (A) comprising a core (a) and at least one envelope (b) other than said core (a), and with at least one hydrophobicizing agent (B) and thereafter thermally treating said surface,
   wherein said core (a) and said envelope (b) each comprise an organic copolymer.

2. The process according to claim 1 wherein said at least one hydrophobicizing agent is selected from halous polymers (B1), paraffins (B2) and compounds having at least one $C_{10}$-$C_{60}$-alkyl group per molecule (B3).

3. The process according to claim 1 wherein said surface is at least one surface of at least one flexible substrate.

4. The process according to claim 1 wherein said surface is at least one textile surface.

5. The process according to claim 1 wherein said particles (A) have a number average diameter in the range from 20 to 1000 nm.

6. The process according to claim 1 wherein said core (a) comprises a crosslinked copolymer of at least one ethylenically unsaturated compound.

7. The process according to claim 1 wherein said particles (A) comprise an envelope (b) comprising a crosslinked or crosslinking-capable copolymer of at least one ethylenically unsaturated carboxylic acid or at least one ester or amide of an ethylenically unsaturated carboxylic acid.

8. The process according to claim 1 wherein said core (a) or said envelope (b) comprise a cationic copolymer.

9. The process according to claim 1 wherein said core (a) of said particles (A) has an average diameter in the range from 10 to 950 nm.

10. The process according to claim 1 wherein the step of thermally treating is effected at below the melting temperature of said core (a).

11. The process according to claim 1 wherein a primer (E) is applied to said surface before coating with said particles (A).

12. The process according to claim 11 wherein said primer (E) carries a charge opposite to that of said particles (A).

13. A coated surface produced by a process according to claim 1.

14. An article having at least one surface according to claim 13.

* * * * *